(12) United States Patent
Jiang

(10) Patent No.: US 12,497,701 B2
(45) Date of Patent: Dec. 16, 2025

(54) METHODS FOR MAKING CUTTING TOOL INSERTS USING PROTECTIVE COATINGS

(71) Applicant: P&S Global Holdings LLC, Houston, TX (US)

(72) Inventor: Wenping Jiang, Fayetteville, AR (US)

(73) Assignee: P & S Global Holdings LLC, Houston, TX (US)

( * ) Notice: Subject to any disclaimer, the term of this patent is extended or adjusted under 35 U.S.C. 154(b) by 185 days.

(21) Appl. No.: 18/430,285

(22) Filed: Feb. 1, 2024

(65) Prior Publication Data

US 2024/0167166 A1    May 23, 2024

Related U.S. Application Data

(63) Continuation-in-part of application No. 16/849,405, filed on Apr. 15, 2020, now Pat. No. 11,919,091, which is a continuation-in-part of application No. 15/443,887, filed on Feb. 27, 2017, now Pat. No. 11,267,053.

(60) Provisional application No. 62/300,634, filed on Feb. 26, 2016.

(51) Int. Cl.
| | |
|---|---|
| *C23C 30/00* | (2006.01) |
| *B23B 27/14* | (2006.01) |
| *C23C 16/32* | (2006.01) |
| *C23C 16/34* | (2006.01) |
| *C23C 16/40* | (2006.01) |

(52) U.S. Cl.
CPC .......... *C23C 30/005* (2013.01); *B23B 27/148* (2013.01); *C23C 16/32* (2013.01); *C23C 16/34* (2013.01); *C23C 16/403* (2013.01); *B23B 2228/105* (2013.01); *B23B 2228/36* (2013.01)

(58) Field of Classification Search
None
See application file for complete search history.

(56) References Cited

U.S. PATENT DOCUMENTS

| | | | |
|---|---|---|---|
| 2003/0022029 A1* | 1/2003 | Kidama | ................ C23C 30/005 |
| | | | 428/701 |
| 2013/0216777 A1* | 8/2013 | Jiang | ....................... C23C 16/36 |
| | | | 977/773 |

* cited by examiner

*Primary Examiner* — Shamim Ahmed
*Assistant Examiner* — Bradford M Gates
(74) *Attorney, Agent, or Firm* — Kean Miller LLP; Robert Devin Ricci; Taylor Dunne

(57) ABSTRACT

Disclosed herein is a method for coating carbide substrates using nanostructured and a non-nanostructured layers. The coatings can be produced by the addition of a refining agent flow, particular hydrogen chloride gas, during deposition, and can be produced as multiple individual titanium and titanium-based nanostructured layers varying functional materials. The combination of a nanostructured layers and non-nanostructured layers can produce a cutting tool insert that exhibits longer usage life. In addition, pre-treating the substrate with a mixture of compressed air and abrasive medium prior to coating the substrate and post-treating the coated substrate with a mixture of water and an abrasive can further enhance the wear resistance and life of the cutting tool.

11 Claims, 8 Drawing Sheets

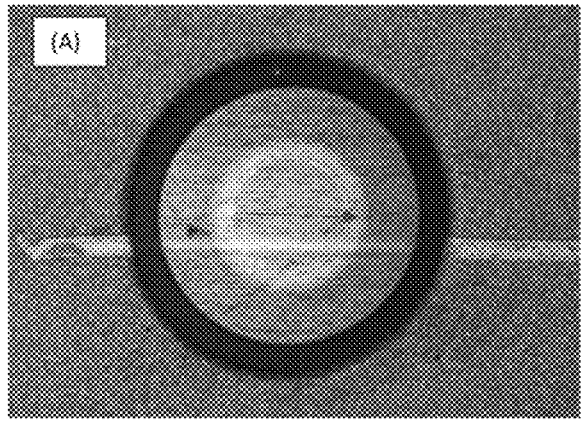 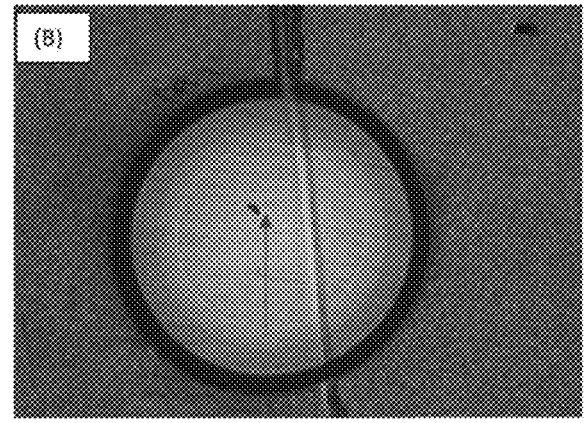
FIGURE 11A                FIGURE 11B
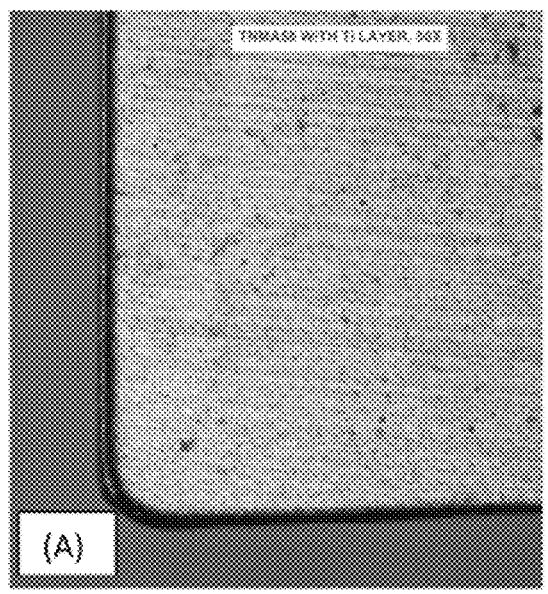 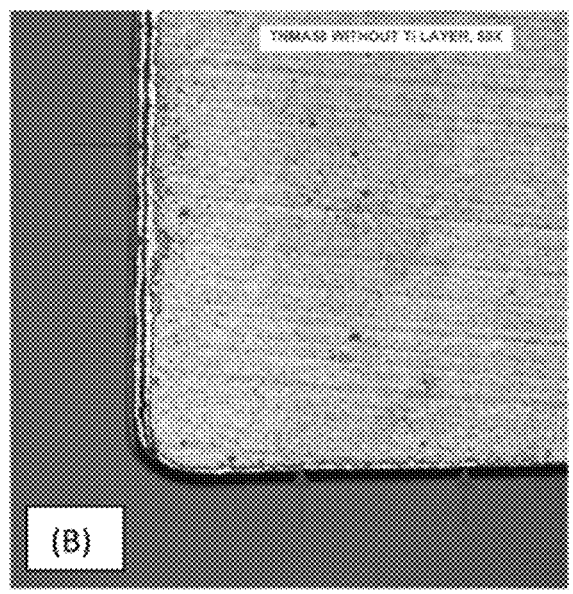
FIGURE 12A                FIGURE 12B Table 1: Process Parameters and Precursors for Layers Deposited on Substrate 10.

| Coating | H$_2$ | N$_2$ | HCl | TiCl$_4$ | CH$_3$CN | CH$_4$ | CO$_2$ | H$_2$S | Temp (°C) | Pressure (mbar) | Duration (min) |
|---|---|---|---|---|---|---|---|---|---|---|---|
| n-TiN | 54.3% | 34.3% | 4.67% | 7.63% | | | | | 930 | 160 | 60 |
| n-TiCN | 54.5% | 31.1% | 4.67% | 9.34% | balanced | | | | 885 | 60 | 60 |
| n-TiCN | 54.5% | 31.1% | 4.67% | 9.34% | balanced | | | | 885 | 90 | 180 |
| TiCN with carbon enriched layer | 82.87% | 5.53% | | balanced | | 3.31% | | | 1010 | 100 | 30 |
| Al$_2$O$_3$ | 87.46% | | 8.81% | | | | 3.4% | balanced | 1015 | 60 | 210 |
| TiN | 63.16% | 26.31% | | balanced | | | | | 1015 | 100 | 30 |

FIGURE 14

METHODS FOR MAKING CUTTING TOOL INSERTS USING PROTECTIVE COATINGS

CROSS-REFERENCE TO RELATED APPLICATIONS

The application is a continuation-in-part of U.S. patent application Ser. No. 16/849,405, filed Apr. 15, 2020, which is a continuation-in-part of U.S. patent application Ser. No. 15/443,887, filed on Feb. 27, 2017 (now U.S. Pat. No. 11,267,053), which claims priority from U.S. Provisional Patent Application No. 62/300,634, filed Feb. 26, 2016, each of which is incorporated herein by reference in its entirety.

BACKGROUND

Field

Provided herein are methods for making cutting tool inserts that are coated with nanostructured layers to make a hard, resilient coating.

Description of the Related Art

Coatings can be effective for improving the wear resistance and corrosion resistance of various materials. Common applications where a coating is applied to a substrate to improve the wear resistance of the substance include cutting tool inserts for the cutting of hard-to-cut materials, such as hardened steel with interruptions and the machining of heat-resistant alloys.

Wear on the coatings of cutting tools is a well-recognized problem. Wear can occur when cutting hard metals often when abrupt interruptions happen. The coatings can be chipped off, resulting in premature failure of the cutting tool, or excessive flank wear, resulting in poor performance. Multiple-layer coatings for cutting tools have been developed. However, improved wear life is still desired, particularly for cutting hardened steel.

Machining heat-resistant alloys can also produce wear on the coatings for cutting tools. Such applications can give excessive heat generation at the tool-workpiece interface, workpiece hardening, and expedited tool wear including notch wear. Because of these challenges, machining of heat resistant alloys has generally been limited to relatively low material removal rate (i.e., low surface speed and feed rate). Advances in materials, chip breaker design, edge honing, and coatings have been made, but problems remain.

Consequently, there is a need for new methods for making cutting tool inserts using multi-layered coatings.

SUMMARY

Disclosed here are methods for making cutting tool inserts using multi-layered coatings. In a specific embodiment, a method of making a cutting tool insert includes: depositing an at least one nanostructured layer to at least partially coat a substrate, where the depositing occurs one at a time over the substrate or a prior at least one nanostructured layer until the deposition of a final at least one nanostructured layer to make a nanostructured coating, where the substrate is selected from carbide, tungsten carbide, ceramics, cemented carbide, and cemented hard metals, where the substrate has a hardness range of 90 to 93 HRA, where the substrate has a surface roughness from about 0.05 to about 1.5 micron, where the substrate has an average grain size from about 0.4 to about 0.8 microns, where the substrate has a honing edge with a radius, where the radius of the honing edge is from about 10 microns to about 35 microns, where each of the at least one nanostructured layer is selected from titanium, titanium carbonitride, titanium carbide, and titanium nitride; depositing an at least one carbon-enriched layer to at least partially coat the final at least one nanostructured layer, where the depositing occurs one at a time over the final at least one nanostructured layer or the prior at least one carbon-enriched layer until the deposition of a final at least one carbon-enriched layer; and depositing an at least one non-nanostructured layer to at least partially coat the final at least one carbon-enriched layer, where the depositing occurs one at a time over the final at least one carbon-enriched layer or an at least non-nanostructured layer until the deposition of a final at least at least non-nanostructured layer, where the final non-nanostructured layer includes an aluminum oxide layer, where the aluminum oxide layer has a surface roughness from about 0.05 microns to about 0.5 microns.

In another specific embodiment, a method of making a cutting tool insert includes: providing a carbide substrate, where the substrate has an average tungsten carbide grain size from about 0.4 to about 0.8 microns, where the substrate has a honing edge with a radius of about 10 microns to about 35 microns, and where the substrate has a surface roughness from about 0.5 to about 1.5 micron; depositing a nanostructured coating over the substrate, where the nanostructured coating including a first nanostructured layer deposited over the substrate, a second nanostructured layer deposited over the first nanostructured layer, a third nanostructured layer deposited over the second nanostructured layer, a fourth nanostructured layer deposited over the third nanostructured layer, a carbon enriched layer deposited over the fourth nanostructured layer, where the carbon enriched layer includes a carbon enriched layer of titanium carbonitride; and depositing a non-nanostructured layer over the carbon enriched layer, where the non-nanostructured layer includes an aluminum oxide layer, where the aluminum oxide layer has a surface roughness ranging from about 0.05 to about 0.5 microns, and where a nanostructured-to-non-nanostructured interface at a face of the non-nanostructured layer is in contact with the nanostructured layer.

BRIEF DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is thereby intended.

FIG. 11A is an optical image showing the coating with a titanium layer in a first sample comparison.

FIG. 11B is an optical image showing the coating without a titanium layer in a first sample comparison.

FIG. 12A is a second optical image showing the coating with a titanium layer in a second sample comparison.

FIG. 12B is a second optical image showing the coating without a titanium layer in a second sample comparison.

FIG. 14 shows Table 1, which is a summary of the process parameters and precursors for the deposition of layers on substrate 10.

DETAILED DESCRIPTION

Figure 1:
FIG. 1 is an illustration of one embodiment of the present invention, showing a coated substrate having a nanostructured coating comprising a single nanostructured layer deposited over the substrate.

In one or more embodiments, a method of making a cutting tool insert can include but is not limited to: making a nanostructured adherent coating on a substrate for enhancing the wear resistance performance of the substrate. In some embodiments, the nanostructured coating can include, but is not limited to, a single nanostructured layer of functional particles. In some embodiments, configurations of nanostructured layers can include multiple sub-layers each including functional particles coupled with other layers can provide improved performance of the coating and the cutting tool insert.

It has been unexpectedly discovered that using specific layers in certain combinations can give an improved performance by decreasing wear and coating delamination and increasing the performance life of the cutting tool insert. For example, the coatings have an improved hardness and toughness, which reduces edge chip-off and flank wear, particularly in difficult applications such as machining hardened steel with interruptions or machining of heat-resistant alloys. In addition, surface treatments before and/or after the substrate has been coated can extend the performance of the substrate for various applications.

In one or more embodiments, a method of making a cutting tool insert can include but is not limited to: depositing an at least one nanostructured layer to at least partially coat a substrate, where the depositing occurs one at a time over the substrate or a prior at least one nanostructured layer until the deposition of a final at least one nanostructured layer, where the substrate is selected from carbide, tungsten carbide, ceramics, cemented carbide, and cemented hard metals, where the substrate has a hardness range of 90 to 93 HRA, where the substrate has a surface roughness from about 0.05 to about 1.5 micron, where the substrate has an average grain size from about 0.4 to about 0.8 microns, where the substrate has a honing edge with a radius, where the radius of the honing edge is from about 10 microns to about 35 microns, where each of the at least one nanostructured layer is selected from titanium, titanium carbonitride, titanium carbide, and titanium nitride; depositing an at least one carbon-enriched layer to at least partially coat the final at least one nanostructured layer, wherein the depositing occurs one at a time over the final at least one nanostructured layer or the prior at least one carbon-enriched layer until the deposition of a final at least one carbon-enriched layer; and depositing an at least one non-nanostructured layer to at least partially coat the final at least one carbon-enriched layer, where the depositing occurs one at a time over the final at least one carbon-enriched layer or an at least non-nanostructured layer until the deposition of a final at least at least non-nanostructured layer, where the final non-nanostructured layer includes an aluminum oxide layer, wherein the aluminum oxide layer has a surface roughness from about 0.05 microns to about 0.5 microns.

In one or more embodiments, a method of making a cutting tool insert can include, but is not limited to: providing a carbide substrate, where the substrate has a hardness range of 90 to 93 HRA, where the substrate has an average tungsten carbide grain size of 0.4 to 0.8 microns, a honing edge in the range of 10 and 35 microns, and a surface roughness of 0.05 to 1.5 micron; depositing one or more nanostructured layers to at least partially coat the substrate, wherein a first at least one nanostructured layer is deposited over the substrate, and if applicable, followed by depositing a series of at least one nanostructured layers, one at a time over a prior at least one nanostructured layer until application of a final at least one nanostructured layer resulting in a nanostructured coating, where each at least one nanostructured layer is selected from titanium, titanium carbonitride, titanium carbide, and titanium nitride; depositing a carbon enriched layer over an outer surface of the final at least one nanostructured layer where the carbon enriched layer includes a carbon enriched layer of titanium carbonitride; and depositing a non-nanostructured layer over the carbon enriched layer where the non-nanostructured layer includes an aluminum oxide layer with a surface roughness ranging from 0.05 to 0.5 microns. In some embodiments, a method of making a cutting tool insert can include, but is not limited to: one or more providing steps; one or more deposition steps; one or more applying steps; and combinations thereof.

The one or more substrates can include a hardness that varies widely. For example, the substrate can have a hardness from a low of about 40 HRA (Rockwell hardness A scale), about 80 40 HRA, about 88 HRA, to a high of about 93 HRA, about 96 HRA, or about 99 HRA. In another example, the substrate can have a hardness from about 40 HRA to about 99 HRA, about 89 HRA to about 94 HRA, or ab 90 HRA to 93 HRA.

The one or more substrates can include a grain size that varies widely. For example, the substrate can have a grain size from a low of about 0.1 microns, about 0.2 microns, or about 0.4 microns, to a high of about 0.8 microns, 1.0 microns, 1.2 microns, or about 1.4 microns. In another example, the substrate can have a grain size from about 0.1 microns to about 0.6 microns, about 0.4 to about 0.8 microns, or about 0.3 to about 0.9 microns.

The one or more substrates can include a surface roughness that varies widely. For example, the substrate can have a surface roughness from a low of about 0.05 microns, about 0.1 microns or about 0.5 microns, to a high of about 1.5 micron, about 2.0 micron, or 3.0 microns. In another example, the substrate can have a surface roughness from about 0.05 microns to about 0.1 microns, about 0.05 microns to about 0.15 microns, about 0.06 microns to about 1.0 microns, or about 0.05 microns to about 1.5 microns.

The honing edge of the substrate can have a thickness that varies widely. For example, the honing edge can have a thickness from a low of about 1.0 microns, about 2.0 microns, or about 5.0 microns, to a high of about 50.0 microns, about 100.0 microns, or about 150.0 microns. In another example, the honing edge can have a thickness from about 1.0 microns to about 150 microns, about 1.0 microns to about 5.0 microns, about 2.0 microns to about 35.0 microns, about 5.0 microns to about 30.0 microns, about 6.0 microns to about 45.0 microns, or about 50.0 microns to about 145.0 microns.

The honing edge of the substrate can have an edge hone radius that varies widely. For example, the honing edge can have an edge hone radius from a low of about 1.0 microns, about 2.0 microns, or about 5.0 microns, to a high of about 50.0 microns, about 100.0 microns, or about 150.0 microns. In another example, the honing edge can have an edge hone radius from about 1.0 microns to about 150 microns, about 1.0 microns to about 5.0 microns, about 2.0 microns to about 35.0 microns, about 5.0 microns to about 30.0 microns, about 6.0 microns to about 45.0 microns, or about 50.0 microns to about 145.0 microns.

In some embodiments, the cutting tool insert can include a coated substrate. In some embodiments, the cutting tool insert can include a one or more layers deposited and/or applied to at least partially coat a surface of a substrate. For example, the coating can include a first layer, second layer, third layer, fourth layer, fifth layer, sixth layer, seventh layer, eighth layer, ninth layer, tenth layer, eleventh layer, twelfth layer, thirteenth layer, fourteenth layer, fifteenth layer, sixteenth layer, seventeenth layer, eighteenth layer, nineteenth layer, twentieth layer, twenty-first layer, twenty-second layer, twenty-third layer or higher numbers of layers. The final layer or outermost layer can include one or more carbon enriched layers.

The one or more layers can include one or more particles. The one or particles can include, but is not limited to: one or more nanoparticles, one or more non-nanoparticles, one or more microparticles, and combinations thereof. The one or more layers can include, but is not limited to: nanostructured layers, non-nanostructured layers, and combinations thereof. For example, a nanostructured coating layer can include a single layer including particles (FIG. 1) or as a series of sub-layers each including particles (FIG. 2). In some embodiments, a first titanium containing layer 11 can include a layer of relatively pure titanium (Ti), followed by the application of additional nanostructured and non-nanostructured layers (for example FIG. 9). A nanostructured-to-nanostructured interface can increase the contact area, improving the adhesion between the layers. In some embodiments, the substrate can be treated prior to coating the substrate coated with the coating layer(s) and/or treated after the coating process to further enhance the wear resistant capabilities of the cutting tool insert.

The coating can have a thickness that varies widely. For example, the coating can have a thickness from a low of about 1.0 microns, about 2.0 microns, or about 5.0 microns, to a high of about 50.0 microns, about 100.0 microns, or about 150.0 microns. In another example, the coating can have a thickness from about 1.0 microns to about 150 microns, about 1.0 microns to about 5.0 microns, about 2.0 microns to about 35.0 microns, about 5.0 microns to about 30.0 microns, about 6.0 microns to about 45.0 microns, or about 50.0 microns to about 145.0 microns.

The one or more layers can have a thickness that varies widely. For example, the one or more layers can have a thickness from a low of about 1.0 microns, about 2.0 microns, or about 5.0 microns, to a high of about 50.0 microns, about 100.0 microns, or about 150.0 microns. In another example, the one or more layers can have a thickness from about 1.0 microns to about 150 microns, about 1.0 microns to about 5.0 microns, about 2.0 microns to about 35.0 microns, about 5.0 microns to about 30.0 microns, about 6.0 microns to about 45.0 microns, or about 50.0 microns to about 145.0 microns.

The layers can have a content of the one or more nanoparticles that varies widely. For example, the layers can have a content of the one or more nanoparticles from a low of about 0.1 wt %, about 1.0 wt %, or about 5.0 wt %, to a high of about 20.0 wt %, about 30.0 wt %, to about 70.0 wt %. In another example, the layers can have a content of the one or more nanoparticles from about 0.1 wt % to about 70.0 wt %, about 2.1 wt % to about 70.0 wt %, about 4.0 wt % to about 20.0 wt %. In another example, the layers can be free of the one or more nanoparticles.

The one or more nanoparticles can have a radius that varies widely. For example, the nanoparticles can have a radius from a low of about 1.0 nm, about 5.0 nm, or about 10.0 nm, to a high of about 50.0 nm, about 100.0 nm, or about 999.0 nm. In another example, the nanoparticles can have a radius from about 1.0 nm to about 999.0 nm, about 2.0 nm to about 10.0 nm, about 5.0 nm to about 50.0 nm, about 20.0 nm to about 100.0 nm, or about 30.0 nm to about 70.0 nm.

The one or more nanoparticles can have a length that varies widely. For example, the nanoparticles can have a length from a low of about 1.0 nm, about 5.0 nm, or about 10.0 nm, to a high of about 50.0 nm, about 100.0 nm, or about 999.0 nm. In another example, the nanoparticles can have a length from about 1.0 nm to about 999.0 nm, about 2.0 nm to about 10.0 nm, about 5.0 nm to about 50.0 nm, about 20.0 nm to about 100.0 nm, or about 30.0 nm to about 70.0 nm.

Figure 2:
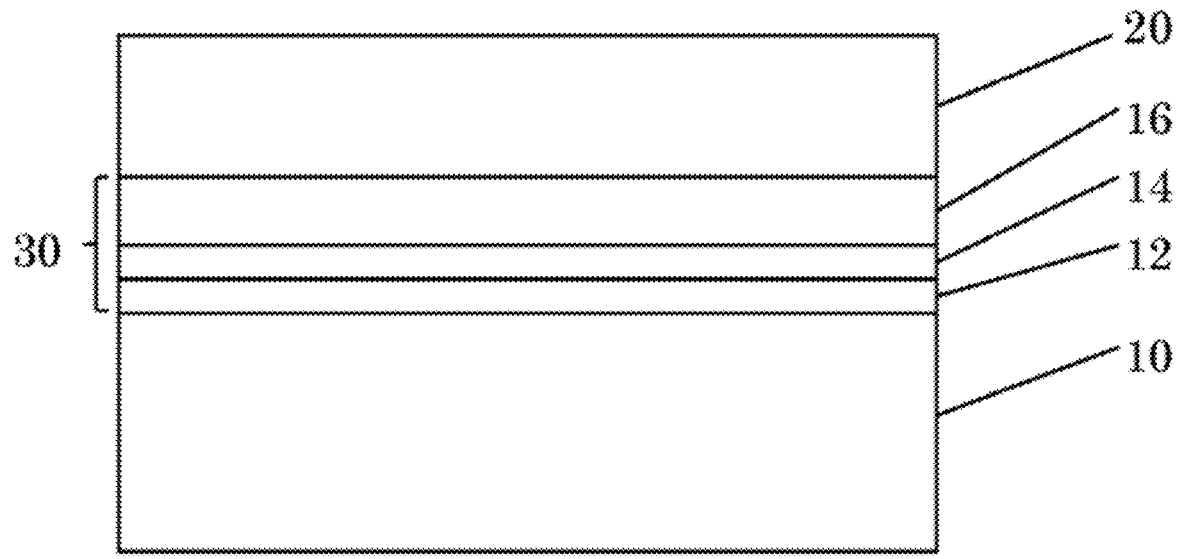
FIG. 2 is an illustration of one embodiment of the present invention, showing a coated substrate having a nanostructured coating comprising a number of nanostructured layers deposited over the substrate and having an optional non-nanostructured layer deposited over the nanostructured layer.

Referring to FIG. 1, an embodiment of a cutting tool insert can include a substrate 10, forming a base for the tool insert. The substrate 10 can include a grain size in the sub-micron and micron range of about 0.1 to about 1.5 microns and an average grain size of about 0.4 to about 0.8 microns. For example, substrate 10 can include a carbide substrate with tungsten carbide (WC) grain size in the range of sub-microns to microns range. For purposes herein, a sub-micron grain size means that the average size of grains is less than 1 µm in diameter in any direction but greater than nano-sized (i.e., greater than 100 nm in diameter in any direction), while a micron grain size means that the average size of grains is equal to or greater than 1 µm in any direction.

The one or more substrates 10 can include, but is not limited to: carbide, tungsten carbide, ceramics, cemented carbide, cemented hard metals. The substrates 10 can include a binder. The substrates 10 can include a matrix. For example, the substrate 10 can include about 5.0 to 15.0 weight percent of cobalt or nickel as a binder. For example, the substrate can include a carbide substrate having a carbide matrix with submicron and micron sized tungsten carbide grains and a metallic binder phase comprising cobalt in the range of 5 to 12 percent. In some embodiments, the substrate can include an edge hone from about 0.0005" to about 0.002". In some embodiments, the substrate can include, but is not limited to, an edge honing of less than 35 microns, or about 8 and about 20 microns. Finally, the substrate preferably has a hardness in the range of about 90 to about 93 HRA.

The substrate 10 can be treated with a mixture of compressed dry air and an abrasive medium with particle size ranging from about 10 to about 150 microns. A suitable pre-treatment abrasive medium can include oxides and carbides, with the preferred abrasive medium being aluminum oxide. The pressure of the mixture can be in the range of 0.5 bar to 7.0 bar and is preferably from 1.0 bar to 3.5 bars. In a specific embodiment, the substrate can include: a hard metal substrate having a grain size of about 0.1 to 1.5 microns; about 0.4 to about 0.8 microns average grain size; a cobalt content (weight percentage) of 5 to 8 percent; a hardness of 91.8-93.3 HRA; a minimum transverse rupture strength of 275 ksi; and a magnetic saturation of 110-150 emu/gram with grain growth inhibitors no more than 0.65%. In another specific embodiment, the substrate can include a hard metal substrate having a grain size between about 0.1 to about 1.5 micron; about 0.4 to about 0.8 micron average grain size; a cobalt content (weight percentage) of about 9 to about 12 percent; a hardness of about 91.0 to about 92.8 HRA; a minimum transverse rupture strength of 350 ksi; and a magnetic saturation of 110-150 emu/gram with grain growth inhibitors no more than 0.75 wt %.

In some embodiments, a treatment can be applied to substrate 10 before depositing and/or applying a coating and/or the one or more layers. The treatment can include applying a mixture of compressed air and an abrasive medium having particle size in the range of 10 to 150 micron and more preferably in the range of about 30 microns to about 80 microns. The pre-treatment abrasive medium can include oxides and carbides and is preferably aluminum oxide. After the substrate has been treated the one or more layers can be deposited on it.

Figure 3:
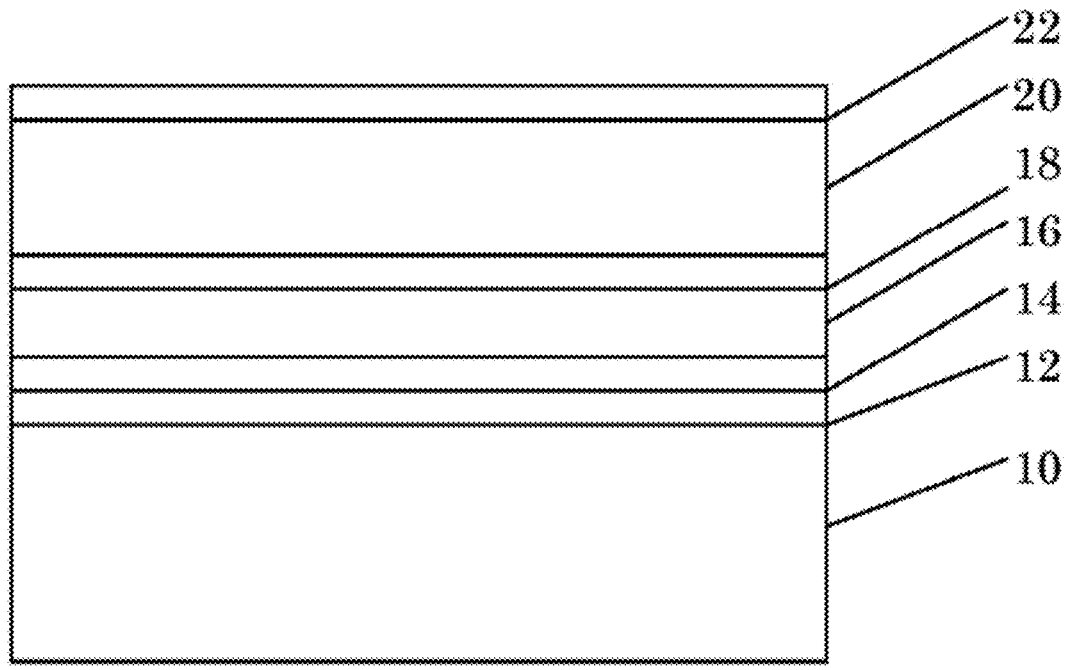
FIG. 3 is an illustration of one embodiment of the present invention, showing a coated substrate having a nanostructured coating comprising a number of nano-structured layers and having a number of additional optional layers deposited on the substrate.
Figure 4:
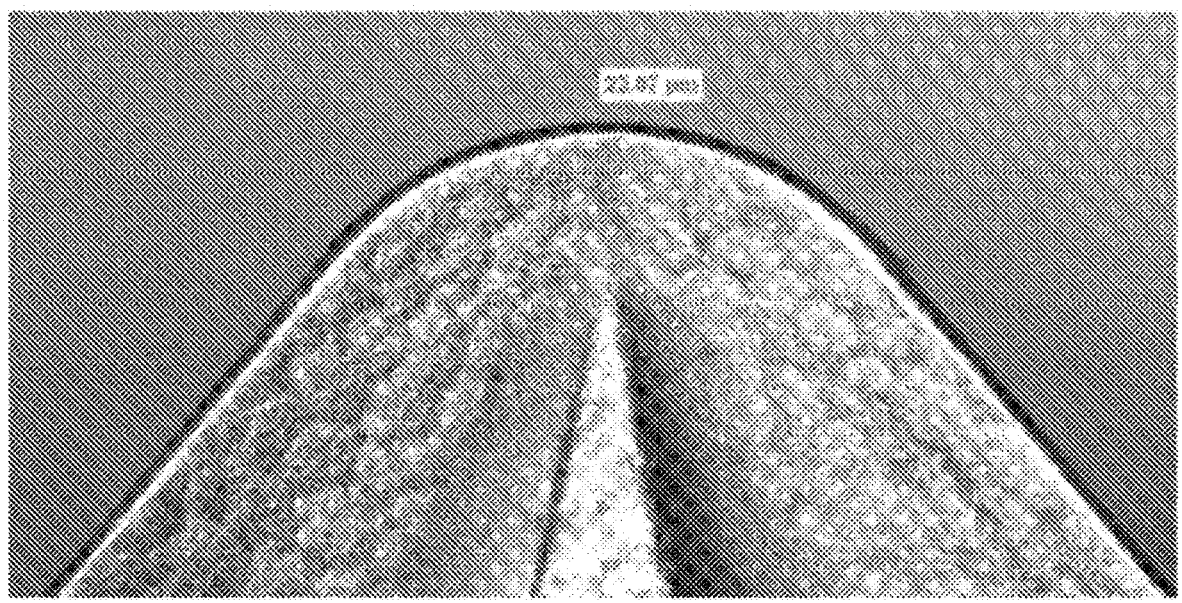
FIG. 4 is a photograph showing one embodiment of the present invention having a carbide insert with edge honing of 23 μm.
Figure 5:
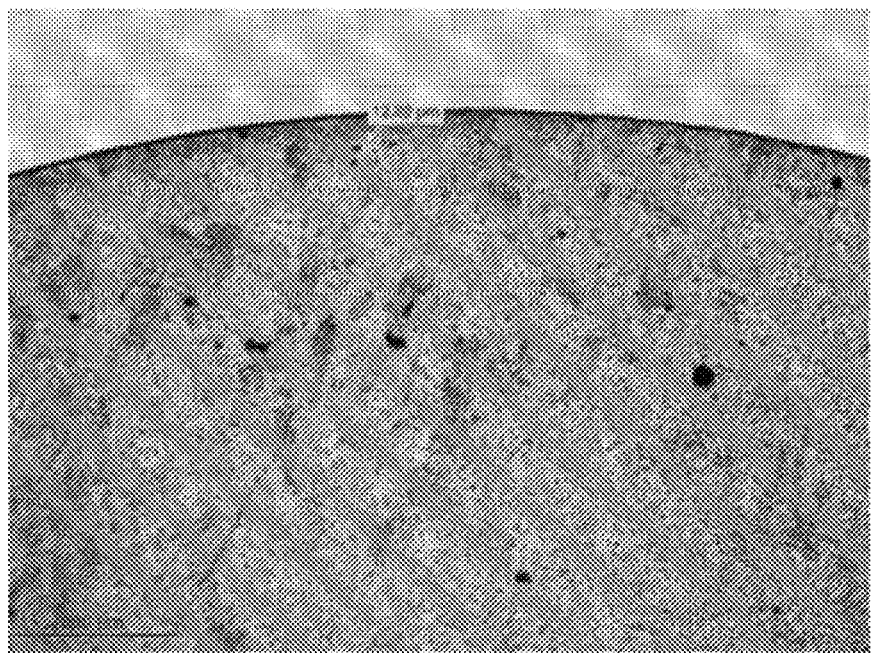
FIG. 5 is a photograph showing one embodiment of the present invention having a carbide insert with edge honing of about 12 μm.

The substrate 10 of the cutting tool insert can be coated with a nanostructured coating 30 deposited over substrate 10 preferably by a chemical vapor deposition (CVD). Nanostructured coating 30 can be a single coating layer (as shown in FIG. 1) comprising a number of different functional particles or can be a series of sub-layers (as shown in FIGS. 2 and 3) with each layer comprising one or more functional materials. In one embodiment, the coating 30 is a single nanostructured coating layer comprising titanium nitride (TiN), titanium carbo-nitride (TiCN), aluminum oxide (a-Al$_2$O$_3$), titanium carbide (TiC), and titanium nitride (TiN) (FIG. 1), while in another embodiment, the nanostructured coating 30 can include multiple nanostructured layers: a first nanostructured layer 12 having TiN, a second nanostructured layer 14 having TiCN, and a third nanostructured layer 16 having TiCN (as shown in FIG. 2).

In some embodiments, a layer of relatively pure (>95%) titanium 11 with thickness of 5 to 150 nm, more specifically, 20 to 80 nm, is first deposited on substrate of carbides (FIG. 9 and FIG. 10) using chemical vapor deposition. This thin layer of titanium can be nanostructured or non-nanostructured as defined herein. In some embodiments, the titanium layer is nanostructured. Following the layer of Ti 11, sequential layers of nanostructured TiN, nanostructured TiCN-1, nanostructured TiCN-2, and a carbon enriched intermediate layer, Al$_2$O$_3$ layer, and a TiN capping layer are deposited by the use of chemical vapor deposition method.

In some embodiments, the titanium layer 11 can enhance the wettability of the substrate surface, promoting overall coating adhesion to the substrate. In some embodiments, the titanium layer 11 can at least partially seal a surface of the substrate inhibiting the Co loss or depletion, for example, when Co is a metallic binder for the substrate. In some embodiments, the titanium layer 11 can include a Ti compositional gradient layer to reduce potential tensile stress buildup at the interface between the substrate and the coating layer.

Figures 7A, 7B:
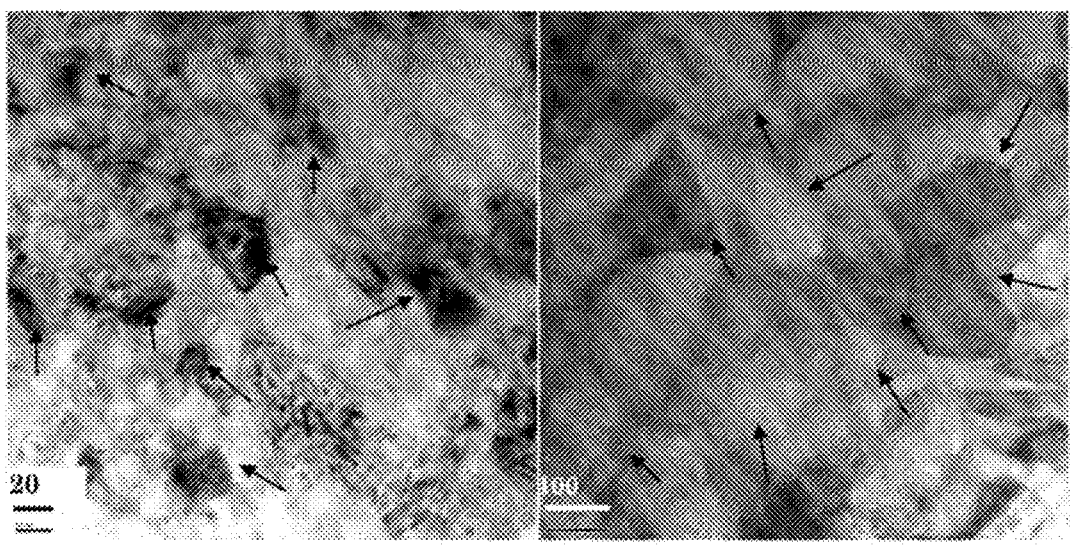
FIG. 7A is an SEM photograph top planar view of a cross-section of a nanostructured TiN layer according to one embodiment of the present invention.
FIG. 7B is an SEM photograph top planar view of a cross-section of a nanostructured TiCN layer according to one embodiment of the present invention.
Figure 8:
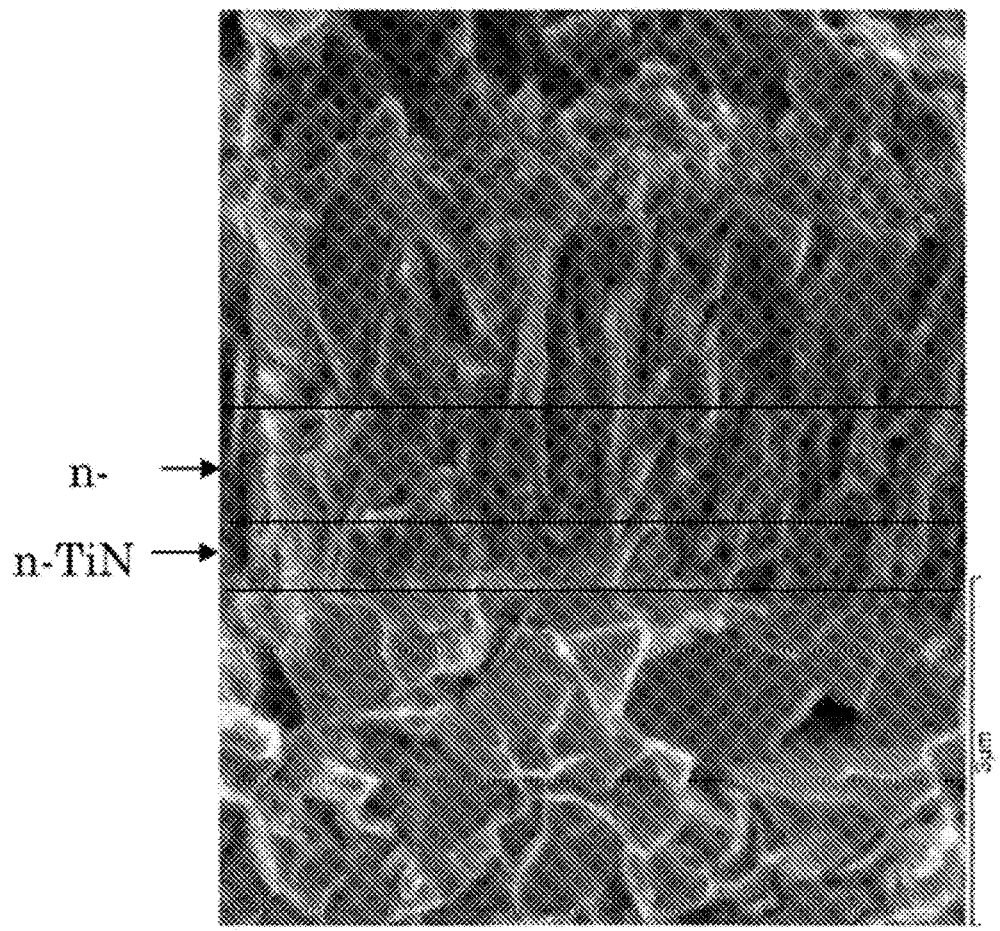
FIG. 8 is an SEM photograph side elevational view of a cross-section of a nanostructured layer according to one embodiment of the present invention.

For purposes herein, "nanostructured" can be defined as a layer that meets at least one of two different tests: a coating layer containing particles of an average size no greater than 100 nm (as used herein, "nano-sized" particles); or a coating layer with grains that are nano-sized in the X-Y plane (that is, parallel to the plane in which coatings are applied), but not necessarily nano-sized in the direction perpendicular to the plane in which the coatings are applied. In this second case of nanostructured, it can be understood then that nano-sized can encompass particles that are "grown" on a surface with a vertical dimension that is greater than 100 nm yet still be within the scope of the meaning of nanostructured. Non-nanostructured, as used herein, means not meeting any of the two different tests for nanostructured; in other words, non-nanostructured refers to a coating layer having particles of average size greater than 100 nm; and with grains measured in the X-Y plane having a size greater than 100 nm. FIG. 8 is an SEM photograph, taken in a direction parallel to the coating thickness, providing an example of this type of structure. FIG. 7A is a TEM image, taken in a direction perpendicular to the coating thickness, showing a TiN where the individual nano-sized grains are visible in the nanostructure.

Figure 9:
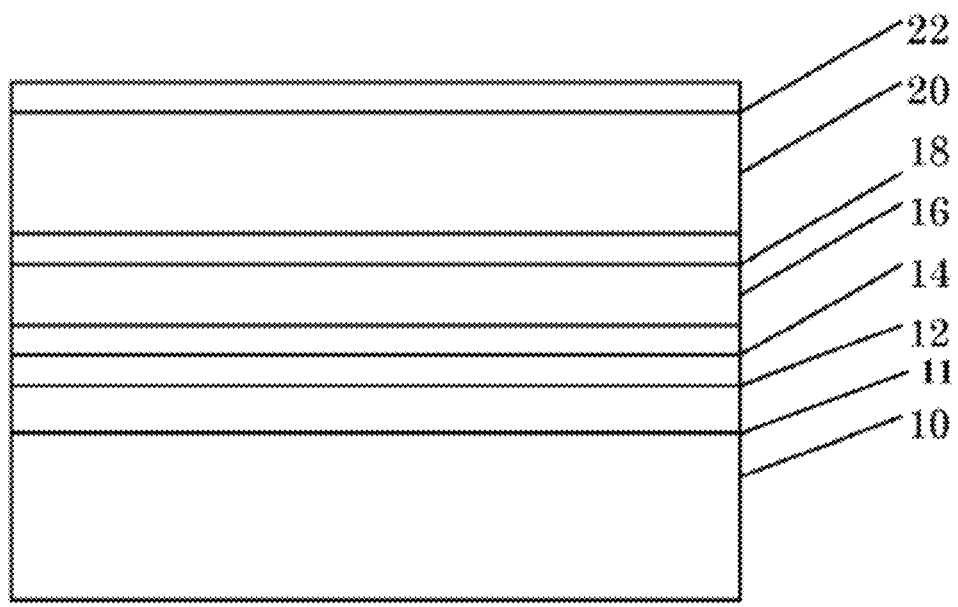
FIG. 9 is an illustration of one embodiment of the present invention, showing a number of nanostructured layers, the first being comprised of titanium.
Figure 10:
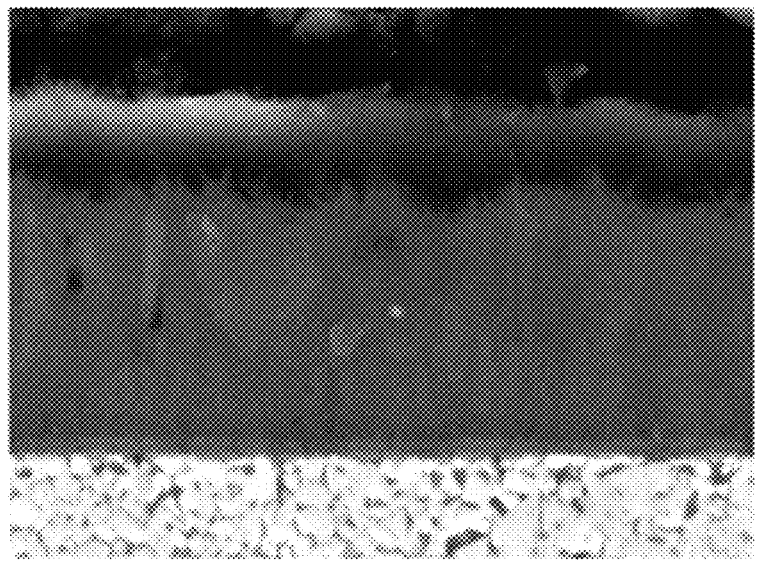
FIG. 10 is an SEM photograph showing the cross-section of the configuration displayed in FIG. 9.

In some embodiments, a non-nanostructured layer is deposited over the nanostructured layer to create a nanostructured-to-non-nanostructured interface. For example, a non-nanostructured aluminum oxide (a-Al$_2$O$_3$) layer 20 can be deposited over the nanostructured coating 30, as shown in FIG. 2. Other additional layers can be optionally deposited over the substrate (as shown in FIGS. 3 and 9), the functional aspects of each of the optional additional layers described more fully below.

A nanostructured coating 30 can include a single layer or a series of individual layers. The following description of individual layers 11, 12, 14, and 16 describe the preferred embodiments of those layers where the nanostructured coating 30 can include, but is not limited to, one or more layers, a series of individual layers, one or more adjacent layers, and combinations thereof.

Layer 11 is preferably a layer of relatively pure titanium with a thickness in the range of about 20 nm to about 80 nm. This pure titanium layer provides the wettability to the substrate to enhance the adhesion of coating layers to the substrate. Further, the pure titanium layer helps to seal the substrate surface to prevent binder (in most cases, Co) from loss due to heat.

Layer 12 is preferably a nanostructured layer of titanium nitride (TiN) with a thickness typically in the range of about 0.5 to 1.0 microns, with average grain size (measured on a plane perpendicular to the coating thickness) that is less than about 100 nm. Layer 12 could be as thin as 0.2 microns. It is believed that TiN layer 12 at this thickness provides a good interfacial layer because of its affinity for the material of substrate 10 or the Ti-layer 11. While the preferred embodiment involves a non-composite layer 12 composed of only TiN, alternative embodiments can include a composite of different materials, in some cases including TiN in the composite, in layer 12.

Layer 14 is preferably a nanostructured layer of titanium carbonitride (TiCN) with a thickness typically in the range of about 0.5 to 1.0 microns. Layer 14 could be as thin as 0.3 microns. This layer 14 has a grain size (measured on a plane perpendicular to the coating thickness) of less than about 100 nm. As with layer 12, it can be noted that the layer's grain size is not limited to nanoscale size when measured on a plane parallel to the coating thickness, and the result can thus be "long" grains that extend vertically in the direction of the coating thickness. FIG. 7B is a TEM image, taken in a direction perpendicular to the coating thickness, showing a TiCN layer according to one embodiment, where the individual nano-sized grains are visible in the nanostructure. It is believed that thin TiCN layer 14 provides desirable properties because it provides a grain-size match to the material of layer 12, thereby providing a minimum of stress at the point of the connection between these two layers, and providing a good transition to the next outer layer.

Layer 16 is preferably a second nanostructured layer of TiCN, with a thickness of about 2.0 to 3.0 microns. Layer 16 could be as thin as 1.0 microns. Again, it can be noted that the layer's grain size is not limited to nanoscale size when measured on a plane parallel to the coating thickness, and the result can thus be "long" grains that extend vertically in the direction of the coating thickness.

As noted above, in one embodiment one or more additional optional layers can be further deposited over the substrate for various functional requirements, as needed. The following descriptions of layers 18 and 22 provide examples of the preferred embodiments of various optional additional layers. It is understood that these optional additional layers can be implemented whether the nanostructured coating 30 is a single nanostructured layer or a series of individual nanostructured layers. Furthermore, it is understood that one additional optional layer can be utilized, multiple optional layers can be utilized in combination (as shown in FIG. 3 for example), or no optional layers can be utilized. Layer 18 is preferably a layer of carbon-enriched TiCN with a thickness of about 0.1 to 0.6 microns, more preferably 0.2 to 0.3 microns. The carbon-enriched layer is a high-temperature TiCxNy layer, where X>1.0, and N<=1.0 and may be nanostructured or non-nanostructured. If deposited directly over the nanostructured coating 30, a nanostructured-to-non-nanostructured interface is created. Layer 22 is an optional capping layer, preferably comprising TiN, with a thickness of less than about 2.0 microns.

Finally, as noted above, a non-nanostructured layer 20 is preferably deposited over either the nanostructured coating 30 or if included, over the carbon-enriched layer 18. If deposited directly over the nanostructured coating 30, a nanostructured-to-non-nanostructured interface is created. Layer 20 is preferably a layer of aluminum oxide (Al2O3), with a thickness of about 3.0 to 4.0 microns. This material is desirable as a thermal barrier to the substrate and lower coating layers on the insert.

Figure 6:
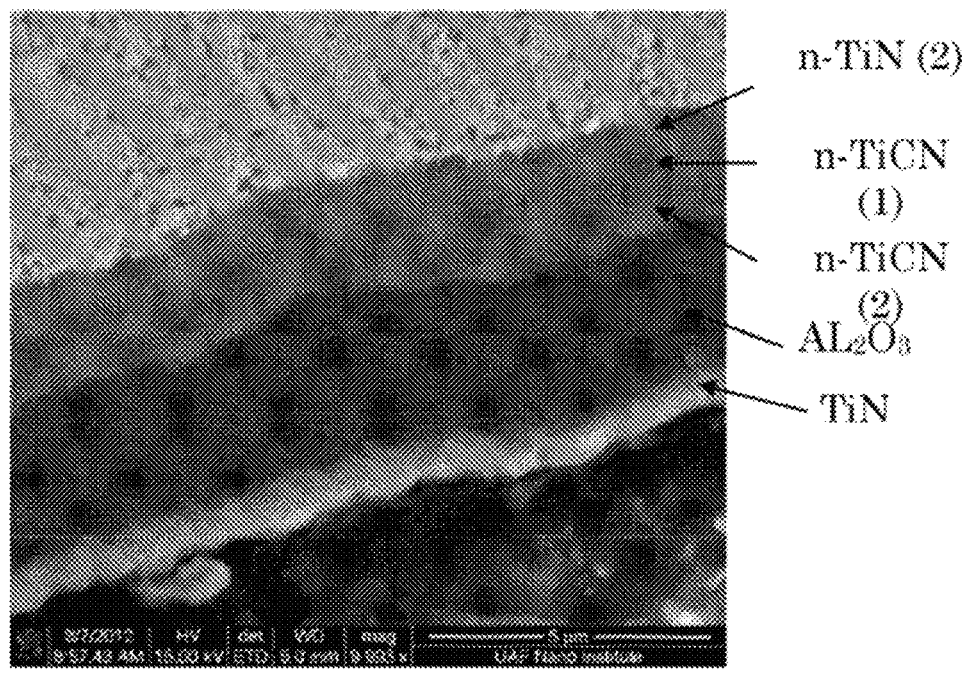
FIG. 6 is an SEM photograph at a side elevational view of a cross-section of multiple coatings according to one embodiment of the present invention.

In some embodiments, the substrate coating (the nanostructured coating and non-nanostructured coating, including any sub-layers of those coatings, in combination) has a total thickness in the range of about 5 to 15 microns, but preferably is between 5 to 13 microns thick. In some embodiments, the coating (the nanostructured layers and non-nanostructured layers, including any sub-layers, in combination) has a total thickness in the range of about 5 to 15 microns, but preferably is between 5 to 13 microns thick. For example, in one embodiment implementing a nanostructured coating of individual nanostructured layers 11, 12, 14, and 16 in addition to non-nanostructured layer 20, and additional optional additional layers 18 and 22, the overall thickness of these six coatings, taken together, is preferably about 5 to 10 microns. FIG. 6 is an SEM photograph in cross-section showing an example of these layers, with the breaks between material layers clearly visible. The ordering of layers is reversed from FIG. 3. It should be noted that although FIGS. 1-3 do not depict this aspect of the preferred embodiment, for the sake of clarity the coating layers in commercial embodiments should preferably extend over the edges of substrate 10.

The most preferred embodiment is present in FIG. 9. The embodiment presented in FIG. 9 differs from that presented in FIG. 3 in that a relatively pure Ti-layer 11 has been deposited over the substrate 10, and below the TiN-layer 12. As shown in FIG. 11, and consistent with the embodiment described in the schematic provided as FIG. 9, a coating with a total thickness of about 5 to 7 microns (2.5 to 3.5 micron of which is nanostructured) was applied on well-polished calo carbide samples with about 5 to 6 wt % Co (binder). One of the calo sample was deposited with a Ti-layer (identical to the coating disclosed here), and the other one without the Ti-layer. A diamond indenter with an inclusive angle of 120 degree is used for scratch testing at 10 kg static loading. As shown in FIG. 11, the sample with Ti-layer FIG. 11A) showed excellent adhesion with both the substrate 10 and the adjacent nanostructured layer 12, while the one without Ti-layer showed coating delamination at the outlet of the scratch (FIG. 11B). Whereas it has been demonstrated herein that a nanostructured-to-nanostructured interface significantly improves coating adhesion between coating layers, it has been further found that use of a high purity platinum nanostructure layer further improves adhesion when compared to other titanium alloys (such as TiCN).

Further considering the embodiment presented in FIG. 9, in a second example, a nanostructured coating layer thickness of about 7 to about 10 microns (about 2.5 to about 3.5 micron of which is nanostructured) applied on grinded TNMA58 inserts with about 7 to about 9 wt % Co (binder). One TNMA58 insert was first deposited with a Ti-Layer (identical to the coating disclosed here), while the other one without the Ti-layer. The coated inserts are subjected to an abrasive post-treatment process with abrasive medium with particle size ranging from 10 to 150 microns, and more preferably from 30-80 microns under identical conditions (abrasive medium pressure of 2.0 bars and 3 minutes). As shown in FIG. 12, inserts with Ti-layer demonstrated an integrated coating on the edge (no delamination, FIG. 12A), while the inserts without Ti-layer showed coating delamination on the edge (pointed by arrows, FIG. 12B).

Figures 13A, 13B:
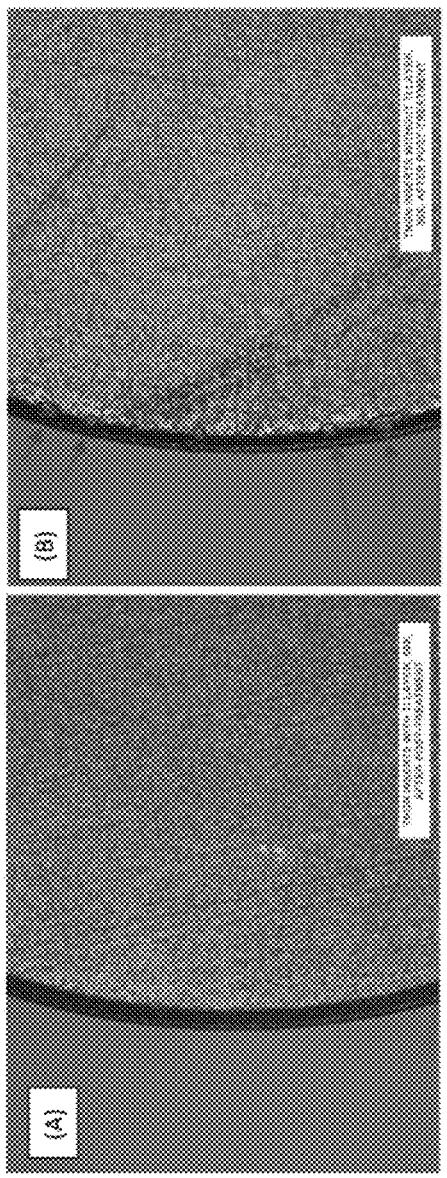
FIG. 13A is a third optical image showing the coating with a titanium layer in a third sample comparison.
FIG. 13B is a third optical image showing the coating without a titanium layer in a third sample comparison.

Further considering the embodiment presented in FIG. 9, in a third example, a coating layer thickness of about 10 to 14 microns (5.5 to 9.5 micron of which is nanostructured) applied on grinded TNGN436 inserts with about 10 wt % Co (binder). One TNGN436 insert was first deposited with a Ti-Layer (identical to the coating disclosed here), while the other one without the Ti-layer. The coated inserts are subjected to an abrasive post-treatment process with abrasive grit size of 28.8 to 58 microns under identical conditions (abrasive medium pressure of 2.0 bars and 3 minutes). As shown in FIG. 13, inserts with Ti-layer demonstrated an integrated coating on the edge (no delamination, FIG. 13A), while the inserts without Ti-layer showed coating delamination on the edge (pointed by arrows, FIG. 13B).

With respect to the preferred embodiment, grain size for the nanostructured layers as described above was performed using transmission electron microscopy (TEM) analysis, as is well understood in the art. Very thin samples (about 0.2 microns in thickness) were prepared with focused ion beam (FIB) methods. As can be seen in FIGS. 7A and 7B, average grain size is less than 100 nm for the nanostructured TiN and TiCN layers; the bar in the figures represents 50 nm. Again, the grain size was measured in the plane perpendicular to coating thickness, and thus the grain size in the plane parallel to coating thickness can be longer, as illustrated, for example, in FIG. 8, where the bar at the right of the figure represents 3 microns.

As indicated above, in one embodiment a post-treatment is applied to the nanostructured coated substrate described above. In some embodiments, a method of application of the post-treatment can include, but is not limited to: treating with a mixture of water and an abrasive medium with particle size ranging from about 0.2 micron to about 50 microns and preferably from 5 microns to 20 microns. Suitable abrasive mediums include oxides and carbides with the preferred abrasive medium being aluminum oxides. The post-treatment mixture contains about 5 to about 50 weight percent of abrasive medium, and more preferably 20 to 40 weight percent abrasive medium. The pressure of the post-treatment mixture ranges from 20 to 120 psi and more preferably from 40 to 80 psi.

In some embodiments, the substrate 10 can be pre-treated with a mixture of compressed dry air and abrasive medium with particle size ranging from 10 to 150 micron, and more preferably from 30 to 80 micron. For this pre-treatment process, the substrates are loaded onto a planetary rotational stage with ten self-rotational poles. The rotational speed preferably ranges from 0.5 to 60 rpm. This pre-treatment process serves as an edge honing process for the substrate. The pre-treated substrate surface has a surface roughness (RMS) ranging from 0.05 to 1.5 microns and the honed edge has a radius ranging from 1.0 to 45 microns, and more preferably from 10 to 35 microns. Following this pre-treatment process, the multi-layer coating process occurs.

In some embodiments, a coating 30, which includes nanoparticles, can be deposited using chemical vapor deposition techniques using a grain-refining agent. In the event multiple nanostructured layers are implemented in a nanostructured coating 30, Ti-layer 11 and TiN layer 12 is deposited using chemical vapor deposition techniques using a grain-refining agent. The process is performed at a medium reactor temperature, specifically about 850° C. to about 920° C. in the preferred embodiment. Ti-layer 11 uses temperature and reactants to control deposition. In particular, the refining agent in the preferred embodiment of TiN layer 12 is hydrogen chloride gas (HCl). It should be noted that HCl is generally seen as undesirable in chemical vapor deposition processes, since it tends to etch away or pit material that is being deposited, and thus slows the process of deposition. By slowing the process, it increases the cost of producing coated tool inserts. It has been found by the inventors, however, that HCl can be used to selectively etch or pit the layer as the deposition process moves forward in order to create nanostructured material. It is believed that the etching or pitting results in nucleation sites, that function to build nanostructure as the layer is deposited. The result, therefore, is a nanostructured layer of material that is produced at a relatively high rate of speed compared to what would be required to produce a similar layer without the refining agent. At this medium-temperature level, the grains produced are columnar, and thus within the definition of nanostructured as presented above.

Nanostructured TiCN layer 14 is also deposited using CVD techniques using the addition of HCl to produce a nanostructured layer. A medium-temperature process is employed, with a reactor temperature in this case of about 885° C. and reactor pressure of about 60 mbar. The second nanostructured TiCN layer 16 is applied at the same temperature, and again with added HCl, at a pressure of about 90 mbar. The TiCN with carbon enrichment layer 18 is deposited using a regular CVD process (no HCl added), at a higher temperature of about 1010° C. and reactor pressure of about 100 mbar.

$Al_2O_3$ layer 20 is deposited at a temperature of about 1005° to 1015° C. It can be noted that while certain references, such as U.S. Patent Publication No. 2006/0204757 to Ljungberg, teach that the $Al_2O_3$ layer desirably can be smoothed or fine-grained, it has been found by the inventors hereof that contrary to this teaching, roughness on this layer is not a detriment to the performance of the insert. For this reason, the inventors have been able to dramatically speed up the deposition process for this material as compared to prior art techniques, since slower deposition is required if a smooth finish is desired. In particular, the method of the preferred embodiment involves a deposition time for this $Al_2O_3$ layer of about 210 minutes, compared to a typical time of deposition of a comparably sized $Al_2O_3$ layer in prior art techniques (where a smooth surface is achieved) of about 4 hours. The TiN capping layer 22 is then deposited on top in a conventional CVD process.

FIG. 14 shows Table 1, which is a summary of the process parameters and precursors for the deposition of layers on substrate 10. Table 2 is a summary of the deposition conditions for the Ti-layer 11.

TABLE 2

| Deposition Conditions for The Ti-Layer 11 | | | |
| --- | --- | --- | --- |
| $H_2$, SLPM | $TiCl_4$ ml/min | Temp (° C.) | Duration (min) |
| 14 | 1.0 | 920 | 10 |

The insert can be finished for cutting by the use of edge preparation techniques as known in the art, including grinding, wire brushing, or similar processes. Alternatively, the coated substrate can be post-treated following the coating process prior to being finished for cutting. As noted above, the insert surfaces can be post-treated with a mixture of water and abrasive medium having particle size ranging from 0.2 to 50 microns, and more preferably from 5 to 20 microns. The abrasive medium can include oxides and carbides and preferably consists of aluminum oxides. During the post-treatment process, the inserts are loaded onto rotational stages driven by a chain and motor such that the rotational speed is between 1 and 50 rpm. The resulting post-treated surface preferably has a surface roughness (RMS) ranging from 0.05 to 0.5 microns. The substrates that have been pre-treated, coated, and post-treated according to the method described herein are suitable for machining and can include nickel-cobalt alloys, titanium alloys, stainless steels, and steels. These inserts are also suitable for cutting operations including turning, grooving, threading, and index milling. While the multi-layer coating process as described herein results in cutting tool inserts with enhanced wear resistance and usage life, the addition of the pre-treatment and post-treatment is believed to increase the wear resistant and usage capabilities of the cutting tools even further. Examples of these results can be found with regard to the non-limiting examples provided below.

EXAMPLES

To provide a better understanding of the foregoing discussion, the following non-limiting examples are offered. Although the examples can be directed to specific embodiments, they are not to be viewed as limiting the invention in any specific respect.

Example 1

In this example, two cutting tool inserts were compared using semi-finish OD turning of rings of Inconel 718 alloys. The first insert was an RPGN-3V carbide grade (C2) substrate with up sharp edge in uncoated form. The second insert was a RPGN-3V carbide insert with a multiple-layer nanostructured coating according to the present invention. The nanostructured coating (TM20) comprised the following layered coating: TiN—TiCN(1)-TiCN(2)-a-$Al_2O_3$ with the first three layers in nanostructured form and the additional alumina layer in non-nanostructured form. The total thickness of the coating layer was 5-9 pm. The second insert comprised an edge hone of 10-20 μm. The tools were used at a surface speed of 200-225 SFM, a feed rate of 0.012 IPR, and a depth cut of 0.01". The failure criteria selected were 0.25 mm flank wear and surface quality (surface finish and waviness) of workpiece quantified using surface profilometer and acoustic method. The results show a drastic increase in tool life for the cutting tool coated according to the present invention: 7-8 minutes of tool life for the non-coated substrate and a 30 minute tool life for the coated carbide substrate.

Example 2

In this example, two cutting tool inserts were compared using OD turning of a low-pressure turbine case made of aged 718 alloys. The first insert was a CVD coated RCMT43 S05F carbide grade (C2) substrate with an edge hone of 25-35 μm. The second insert was an RCMT43 TS2020 carbide insert with a multiple-layer nanostructured coating according to the present invention, where the substrate comprised a micron-grain carbide substrate with hardness of 92.4 and cobalt binder percentage of 6.1%. The nanostructured coating (applied by CVD) comprised the following layered coating in sequence: TiN—TiCN(1)-TiCN(2)-a-$Al_2O_3$ with the first three layers in nanostructured form and the alumina layer in non-nanostructured form. The total thickness of the coating layer was 9 to 13 μm. The second insert comprised an edge hone of 12-25 μm. The tools were used at a surface speed of 180 SFM, a feed rate of 0.012 IPR, and a depth cut of 0.04". The failure criteria selected were 0.25 mm flank wear and surface finish. The results show an increase in tool life for the cutting tool coated according to the present invention: 100 min tool life for the regular CVD coated substrate and 144 min tool life for the multi-layer coating according to the present invention.

Example 3

Cutting tests were performed in connection with a target material of American Iron and Steel Institute (AISI) 4340 hardened steel with severe interruptions. The inserts used for testing were CNMA432 carbide turning inserts, coated with nanostructured coatings in multi-layered form (individual nanostructured layers 12, 14, and 16) and with additional layers 18, 20, and 22 as described above. A benchmark test was performed using the same type of insert (same style and grade) coated with conventional coating techniques with similar chemistry but micron-sized grains in each of the coating layers. The workpiece used was a material with a diameter of 6.0", with four deep, V-shaped slots in the peripherals to provide interruptions for testing, along with four ⅜" diameter through-holes evenly distributed on the end surface. The experimental conditions were as follows: surface speed of 400 SFM; feed rate of 0.004 IPR; depth of cut: 0.01"; dry/wet with cutting fluid; and failure criteria of 0.008" flank wear or 0.004" crater wear.

With these test parameters and workpiece specifications as set out above, the benchmark insert demonstrated a tool life before failure, on average, of about 7 minutes. The insert prepared according to the preferred embodiment of the present invention, as previously described, produced an average tool life before failure of about 20 minutes. It can be seen therefore that the invention produced markedly improved performance over prior art coating techniques for cutting tool inserts, particularly when used in connection with the cutting of hardened steel with severe interruptions, which is known in the art as a particularly difficult material with respect to cutting tool insert life.

Not want to bound by theory, it is believed that the combination of nanostructured layers with other layers that are not nanostructured can be responsible for the dramatically improved performance of this embodiment. The matching of nanostructured and non-nanostructured materials can produce a unique combinatorial architecture delivering dramatically improved results, achieving a cutting tool insert that is less prone to chip-off failure and flank wear problems. Nanostructured-to-nanostructured interface significantly increases contact area and further improves coating adhesion between coating layers. The transition from inner layers to outer layers of smaller-scaled to larger-scaled particles can create a better bond between the layers of the coating and between the coating and the substrate. This structure can also result in fewer stress points—or can compensate for stress points that result from material discontinuities/defects—within the structure of the substrate/coating matrix. The presence of stress points within the coating structure can correlate with premature wear or failure.

Example 4

This example shows the performance enhancements obtained by pre- and post-treatment of the coated substrates. RPGN-3V inserts were used at the following conditions for semi-finishing and finishing Ti-17 alloys: surface speed of 200 to 225 SFM; feed rate of 0.012 IPR; and depth of cut of 0.01" (per side).

At identical tool failure criteria of 0.012" flank wear and workpiece surface finish of 12 RMS, multi-layer coated RPGN-3V TM2005 substrates with submicron grain size, 6.0% cobalt, hardness of 92.8 HRA and total thickness of 7.0 to 9.0 microns, which were pre-treated and post-treated to obtain a surface roughness of 0.5 micron, produced tool life of about 20 minutes, whereas other products of identical geometry, RPGN-3V, from top OEMs produced only 7 to 8 minutes of tool life.

Example 5

Again, this example shows the performance enhancements obtained by pre and post treatment of substrates.

RPGN-3V inserts were used at the following conditions for semi-finishing and finishing 718 inconel alloys (with hardness of more than 40 HRC): surface speed: 200 to 225 SFM; feed rate: 0.012 IPR; and depth of cut: 0.01" (per side).

At identical tool failure criteria of 0.012" flank wear and workpiece surface finish of 12 RMS, multi-layer coated RPGN-3V TM2005 substrates with submicron grain size, 6.0% cobalt, hardness of 92.8 HRA and total thickness of 7.0 to 9.0 microns, which were pre-treated and post-treated to obtain a surface roughness of 0.5 micron, produced tool life of about 30 minutes, whereas other products of identical geometry, RPGN-3V, from top OEMs produced only 7 to 8 minutes of tool life.

Example 6

In this example, two cutting tool inserts, with and without the first relatively pure Ti-layer were compared. Both inserts were prepared with the same coating for pre-hardened steel machining with the same coating thickness (13 to 14 microns) with Ti-layer (A) and without Ti-layer (B) in turning AISI 4140 alloy steels. Workpiece materials were AISI 4140 alloy steel bars with hardness of 24 to 25 HRC. Inserts were CNMG432 MR (chip break geometry) P15 (substrate grade for specifically for steel machining). The experimental conditions were as follows: surface speed of 725 SFM; feed rate of 0.0004 IPR; depth of cut of 0.01" (per side); and failure criteria of flank wear of 0.012".

With these test parameters and workpiece specifications as set out above, the insert without the Ti-layer demonstrated a tool life before failure, on average of 11.5 minutes. The insert prepared with the Ti-layer demonstrated a tool life before failure, on average of 14.8 minutes. Clearly, coating with a Ti-layer enhances tool life due to improved adhesion. Based on the multiple testing, in average, tool life for coating with a Ti-layer in turning pre-hardened steel using identical inserts and same workpiece materials is 29% longer than that from coating with a Ti-layer.

These examples show that a substrate coated with nano-structured coating, especially where the first nanostructured layer consists of a relatively pure titanium layer, and optional additional coating layers not only improves tool performance, but that pre-treatment and post-treatment of these substrates delivers performance enhancement for inserts used in turning titanium alloys and nickel-cobalt alloys. This same performance enhancement can be recognized in machining using stainless steels and steels among others.

One of ordinary skill in the art will readily appreciate that alternative but functionally equivalent components, materials, designs, and equipment can be used. The inclusion of additional elements can be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various modifications to these aspects will be readily apparent, and the generic principles defined herein can be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject technology.

As used herein, the singular forms "a", "an", and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". As used herein, use of the term "including" as well as other forms, such as "includes," and "included," is not limiting.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

The terms "couples", "coupled", "coupler", and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits can be the values from the examples. Certain lower limits, upper limits and ranges appear in at least one claims below. All numerical values are "about" or "approximately" the indicated value, and consider experimental error and variations that would be expected by a person having ordinary skill in the art.

All patents, patent applications, provisional applications, and publications referred to or cited herein are incorporated by reference in their entirety, including all figures and tables, to the extent they are not inconsistent with the explicit teachings of this specification.

Although the invention has been described with reference to the above examples, it will be understood that modifications and variations are encompassed within the spirit and scope of the invention. Accordingly, the invention is limited only by the following claims.

What is claimed is:

1. A method of making a cutting tool insert comprising:
depositing an at least one nanostructured layer to at least partially coat a substrate, wherein the depositing occurs one at a time over the substrate or a prior at least one nanostructured layer until the deposition of a final at least one nanostructured layer to make a nanostructured coating, wherein the substrate is selected from the group consisting of carbide, tungsten carbide, ceramics, cemented carbide, and cemented hard metals, wherein the substrate has a hardness range of 90 to 93 HRA, wherein the substrate has a surface roughness from about 0.05 to about 1.5 micron, wherein the substrate has an average grain size from about 0.4 to about 0.8 microns, wherein the substrate has a honing edge with a radius, wherein the radius of the honing edge is from about 10 microns to about 35 microns, wherein each of the at least one nanostructured layer is selected from the group consisting of titanium, titanium carbonitride, titanium carbide, and titanium nitride;

depositing an at least one carbon-enriched layer to at least partially coat the final at least one nanostructured layer, wherein the depositing occurs one at a time over the final at least one nanostructured layer or the prior at least one carbon-enriched layer until the deposition of a final at least one carbon-enriched layer; and depositing an at least one non-nanostructured layer to at least partially coat the final at least one carbon-enriched layer, wherein the depositing occurs one at a time over the final at least one carbon-enriched layer or an at least non-nanostructured layer until the deposition of a final at least at least non-nanostructured layer, wherein the final non-nanostructured layer comprises an aluminum oxide layer, wherein the aluminum oxide layer has a surface roughness from about 0.05 microns to about 0.5 microns.

2. The method of making a cutting tool insert of claim 1, wherein the first nanostructured layer has a thickness from about 0.02 to about 0.08 microns.

3. The method of making a cutting tool insert of claim 2, wherein the nanostructured coating further comprises a second nanostructured layer deposited over the first nanostructured layer, wherein the second nanostructured layer has a thickness in the range of about 0.5 to about 1.0 microns, wherein the second nanostructured layer consists essentially of titanium nitride.

4. A method of making a cutting tool insert comprising:
providing a carbide substrate, wherein the substrate has an average tungsten carbide grain size from about 0.4 to about 0.8 microns, wherein the substrate has a honing edge with a radius of about 10 microns to about 35 microns, and wherein the substrate has a surface roughness from about 0.5 to about 1.5 micron;

depositing a nanostructured coating over the substrate, wherein the nanostructured coating comprising a first nanostructured layer deposited over the substrate, a second nanostructured layer deposited over the first nanostructured layer, a third nanostructured layer deposited over the second nanostructured layer, a fourth nanostructured layer deposited over the third nanostructured layer, a carbon enriched layer deposited over the fourth nanostructured layer, wherein the carbon enriched layer comprises a carbon enriched layer of titanium carbonitride; and depositing a non-nanostructured layer over the carbon enriched layer, wherein the non-nanostructured layer comprises an aluminum oxide layer, wherein the aluminum oxide layer has a surface roughness ranging from about 0.05 to about 0.5 microns, and wherein a nanostructured-to-non-nanostructured interface at a face of the non-nanostructured layer is in contact with the nanostructured layer.

5. The method of making a cutting tool insert of claim 4, wherein the first nanostructured layer consists of titanium with a thickness from about 0.02 to about 0.08 microns.

6. The method of making a cutting tool insert of claim 5, wherein the second nanostructured layer consists of titanium nitride.

7. The method of making a cutting tool insert of claim 6, wherein the third nanostructured layer consists of titanium carbonitride.

8. The method of making a cutting tool insert of claim 7, wherein the fourth nanostructured layer consists of titanium carbonitride.

9. The method of making a cutting tool insert of claim 8, further comprising a capping layer over the aluminum oxide layer.

10. The method of making a cutting tool insert of claim 9, wherein a total thickness of the four nanostructured layers on the substrate is 3.0 to 5.0 microns.

11. The method of making a cutting tool insert of claim 10, wherein a total thickness of the four nanostructured layers on the substrate is 2.5 to 3.5 microns.

* * * * *